H. B. EVEREST & A. P. ROSS.

C. E. Ross, Executrix of A. P. Ross, dec'd., Assignors to VACUUM OIL COMPANY.

Box and Can for Oil and Paint.

No. 8,225. Reissued May 14, 1878.

Attest.
R. E. White
Louis Spahn.

Inventors.
Hiram B. Everest,
Caroline E. Ross,
per R. L. Osgood
Atty.

N. PETERS, PHOTO-LITHOGRAPHER, WASHINGTON, D. C.

UNITED STATES PATENT OFFICE.

HIRAM B. EVEREST AND CAROLINE E. ROSS, (EXECUTRIX OF AUSTIN P. ROSS, DECEASED,) OF ROCHESTER, ASSIGNORS TO VACUUM OIL COMPANY, OF ROCHESTER, NEW YORK.

IMPROVEMENT IN BOXES AND CANS FOR OILS AND PAINTS.

Specification forming part of Letters Patent No. 132,955, dated November 12, 1872; Reissue No. 8,225, dated May 14, 1878; application filed February 26, 1878.

*To all whom it may concern:*

Be it known that HIRAM B. EVEREST and AUSTIN P. ROSS, both of the city of Rochester, county of Monroe, and State of New York, did invent a certain Improvement in Transportation Cans and Boxes for Oils and other Liquids, of which the following is a specification:

This invention consists of a package for oil-cans and other liquid-receptacles, so arranged as to be closed compactly and securely fastened for transportation, and capable of being elevated in standards or supports, forming a part of the package, so as to be turned on an axis for pouring the liquid contained therein.

Figure 1:
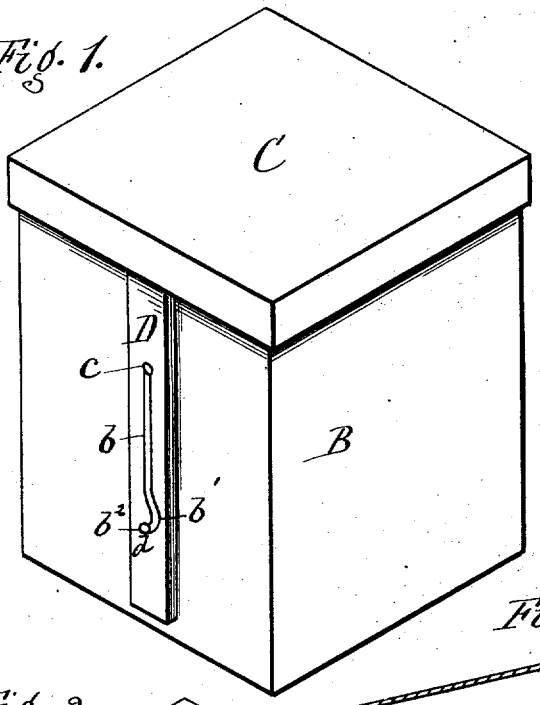
Figure 3:
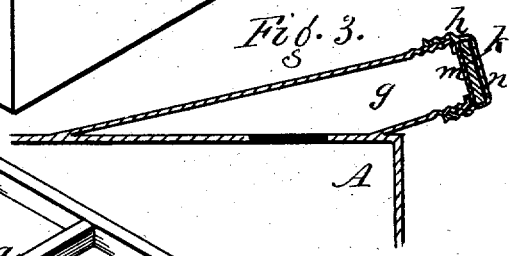
Figure 2:
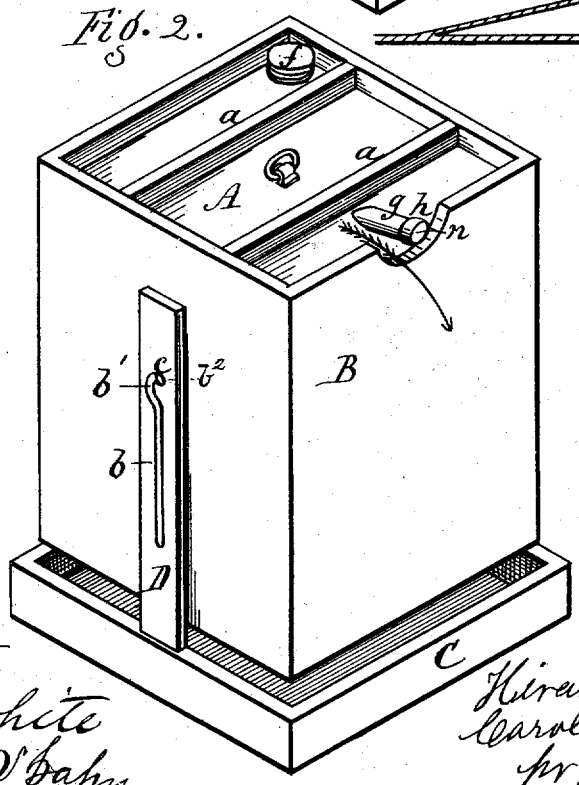

In the drawings, Figure 1 is a perspective view of the package as secured for transportation or storage. Fig. 2 is a similar view of the same reversed, or in position for pouring the contents from the can. Fig. 3 is an enlarged sectional view of the nozzle, showing its connection with the can.

In handling or conveying oils, spirits, acids, &c., it has been customary to incase the cans or receptacles in wood boxes, which are secured fast and made tight by nailing or otherwise. Such packages answer the purpose of a cover or envelope only, and in pouring the contents the can or receptacle has to be removed from the box, which is of no further use.

As an improvement upon that plan, this invention consists in making the box answer the additional purpose of a swinging support to the can by combining therewith arms or standards, or by arranging it in some analogous way, so that the box containing the can can turn upon pivots, thereby allowing the liquid to be poured without removing the can from the box.

A represents the oil-can or other receptacle, which is fitted closely within the box B, being secured, if necessary, by one or more cross-cleats, *a*, which prevent any end movement. The box is fitted with a cover or lid, C, which shuts over its top. This cover has arms D D on two opposite sides, which extend downward a suitable distance, and in these arms are cut slots *b b*, through which pass screws or rivets *c c* attached to the sides of the box. Near the lower end the slots are made curved, as shown at $b^1$ $b^1$, and at the extremity are offsets $b^2$ $b^2$, into which the screws *c c* strike when the cover is reversed, as shown in Fig. 2, thus forming bearings for the box-pivots. Instead of these arms and slots, any analogous means may be used for accomplishing the same effect, which is simply to allow the cover to be raised from the box and turned around under it to form a support in which the box may turn or swing.

When closed for transportation or storage, as in Fig. 1, the cover fits down closely over the top of the box, and is held stationary by means of screws *d d*, which may be either inserted through the offset-bearings $b^2$ $b^2$ of the slots or through the arms at any other point, or they may be inserted through the cover itself into the box.

When adjusted for pouring the liquid, as in Fig. 2, the screws *c c*, resting in the offset-bearings $b^2$ $b^2$, simply support the box in an elevated position, so that it swings upon the screws as an axis, and in turning forward, as indicated by the arrow, the liquid can be discharged from the nozzle without removing the can.

This arrangement, as described, gives an additional function to the inclosing-box, and renders it a convenient device for ordinary uses, as well as a cover for the safe transportation of oils and all other liquids where care is required. The cost is but slightly enhanced, while the value and use of the article are greatly increased.

The usual cap or cover *f* is made to the can or receptacle, and, in addition to this, a discharge-nozzle, *g*, is employed, which stands at an incline in the direction of movement of the box in turning, so as to pour the contents in the proper direction.

The cap *f* and also the cap *n* of the discharge-nozzle are threaded, and screw upon their nipples in the usual manner. To make them tight, a packing, *k*, of cork or equivalent material, is employed, with an outer disk, *m*, of tin-foil or rubber, which rests within the cap and pack against the end of the nipple, thereby making a close joint. This is essential in oils, spirits, acids, &c., which have a great tendency to evaporate and escape by leakage.

It is evident that, instead of making the cover reversible to form the support for the box, a base-board might be used, forming an attachment to the box, and having standards, arms, or equivalent supports, in which the box might be raised to a swinging position.

We do not claim a crane or apparatus for elevating and pouring boxed liquids which is separate and detached from the box; but

We claim—

1. A package for oils or other liquids having, in combination therewith, a frame with supports which form an attachment to the package, and serve as bearings for the pivots when the package is elevated for pouring the liquid.

2. The combination, with a package for containing oils or other liquids, of a frame provided with supports, forming an attachment to the package, and fitting closely thereto when packed, but allowing the package to be elevated upon the supports and turn upon its axis in pouring the liquid, as specified.

3. The part C, forming a cover to the package, provided with the supports D D, having slots for receiving the pivots, and made reversible for the purpose of sustaining the package in an elevated position, as herein described.

In witness whereof we have hereunto set our hands this 18th day of February, 1878.

HIRAM B. EVEREST.
CAROLINE E. ROSS,
*Executrix of the last will and testament of Austin P. Ross.*

Witnesses:
R. F. OSGOOD,
EDWIN SCOTT.